United States Patent [19]

Ohnuma

[11] Patent Number: 5,292,174
[45] Date of Patent: Mar. 8, 1994

[54] POCKET STRUCTURE IN AUTOMOTIVE SEAT

[75] Inventor: Yasuo Ohnuma, Akishima, Japan

[73] Assignee: Tachi-S Co., Ltd., Akishima, Japan

[21] Appl. No.: 780,362

[22] Filed: Oct. 22, 1991

[51] Int. Cl.[5] .................................................. A47C 7/62
[52] U.S. Cl. ..................................... 297/191; 297/188
[58] Field of Search ........................... 297/191, 190, 188

[56] References Cited

U.S. PATENT DOCUMENTS

| | | | |
|---|---|---|---|
| 1,243,958 | 10/1917 | McFarland | 297/191 X |
| 1,646,266 | 10/1927 | Stoner | 297/191 X |
| 2,025,393 | 12/1935 | Kupfer | 297/191 X |
| 2,383,125 | 8/1945 | Hill | 297/191 X |
| 5,004,295 | 4/1991 | Inoue | 297/191 |

FOREIGN PATENT DOCUMENTS 146347 10/1980 Japan.
118050 11/1983 Japan.
33756 3/1990 Japan.

Primary Examiner—Laurie K. Cranmer
Attorney, Agent, or Firm—Oldham, Oldham & Wilson Co.

[57] ABSTRACT

A pocket structure in an automotive seat, wherein a back board is provided at the rear side of seat back, which has a lower half area recessed inwardly of the seat back to define a storage spacing therein, and a pocket board is provided to cover such spacing via a leaf spring so as to define a packet backside of the seat back.

10 Claims, 3 Drawing Sheets

POCKET STRUCTURE IN AUTOMOTIVE SEAT

BACKGROUND OF THE INVENTION

1. Field of the Invention

The present invention relates to a pocket structure in an automotive seat, and particularly relates to a pocket provided at the rear side of a seat cushion of the seat for accommodating therein some articles.

2. Description of Prior Art

In some of automotive seats, the seat back thereof is provided at its back side with a pocket for accommodating magazines, maps or other articles therein. In most instances, such pocket is fabricatted in a net form whose both sides and lower end are fixed to a back board of the seat back, with an entry opening being thus defined at the upper end of the net pocket. The edge of the entry opening is elastically formed by use of a rubber band in general to normally place the opening in a closed state.

However, this typical net-type pocket has been found defective in that a small article will be dropped out through a net mesh and the net pocket itself are expandable outwardly with a great amount of articles accommodated therein, which will impair its outer aesthetic appearance.

Solution has been attempted to this problem from the Japanese Patent Appln. No. 58-199780 in which the pocket in question is formed, using a plate material, into a U-shaped configuration in section having a pair of lateral vertical sections formed at both sides of a flat section, and downwardly projected section formed at the lower end of the flat section.

In this prior art, a backboard of seat back is formed with two spaced-apart slits into which those two lateral vertical sections of pocket are respectively inserted, and further with a lower slit in which is inserted the downwardly projected section of pocket. A spring is provided to bias the pocket in a direction towards the back board so that the pocket is normally kept to be rotated about its downwardly projected section into a closed state. Thus, to push the upper edge of the pocket, using a finger, against such biasing force of spring will cause the pocket to rotate away from the backboard into an opened state, thereby defining a spacing between the backboard and inner wall of pocket for accommodating therein an article. This is certainly advantageous in preventing any small article against dropping out of the pocket, by virtue of the spring acting to retain the article between the backboard and pocket, positively, but the formation of those slits and spacing behind the backboard within the seat back results in a complicated structure of pocket, and making troublesome its design and assemblage.

As another solution, a pocket arrangement wherein the lower part of backboard is formed with a recessed section to define a spacing for accommodation of articles in conjunction with the pocket, has been proposed in the Japanese U.M. Laid-Open Pb. No. 3-24948. However, the pocket itself is merely at its lateral sides sewn to the backboard to provide an entry opening at the upper edge of pocket, into which article may be accommodated. As a result, the pocket are not movable to widen its entry opening and a bigger article can not be accommodated in the pocket.

SUMMARY OF THE INVENTION

In view of the above-stated drawbacks, it is thus a purpose of the present invention to provide an improved pocket structure in an automotive seat which is simplified for allowing storage of articles therein and presents a better outer appearance thereof.

As a first achievement of such purpose, according to the invention, a pocket board member is movably connected via a spring means with a base board secured at the back side of seat back of the seat, the base board having a lower half area which is recessed inwardly of seat back to define a spacing for storage of articles. The pocket board member is therefore so biased by the spring means as to close or cover such spacing of base board. Accordingly, the pocket board member is normally extended flat over the back side of seat back, improving outer appearance of back side of seat back aesthetically.

As a second achievement of the purpose, such recessed lower half area is directly formed in a back board of seat back, such that the pocket board member is movably connected via U-shaped spring with the back board. This U-shaped spring may be used for the above spring means.

DETAILED DESCRIPTION OF PREFERRED EMBODIMENTS OF THE INVENTION

FIGS. 1 through 4 illustrate a first embodiment of a pocket structure in seat back in accordance with the present invention.

Figure 4:
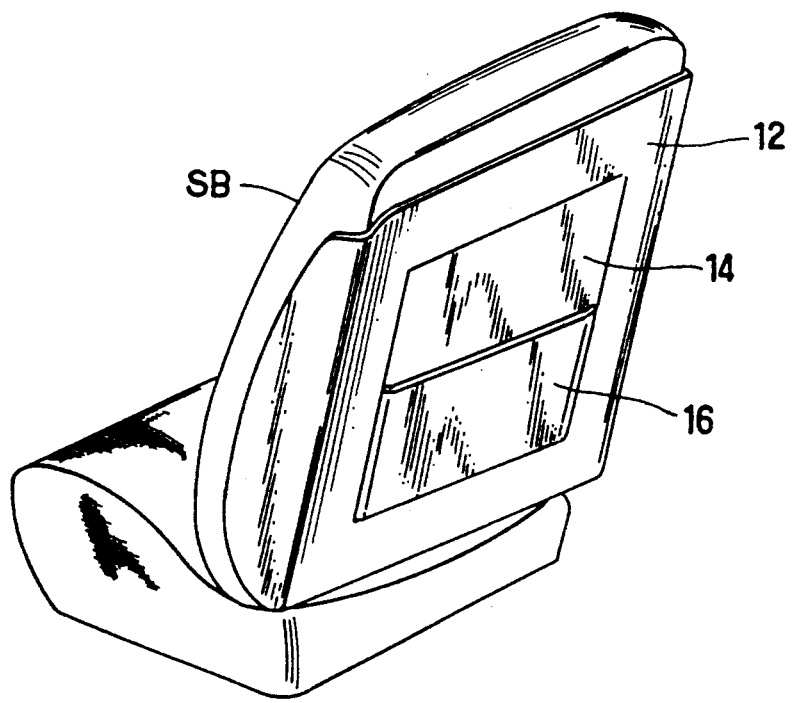
FIG. 4 is a perspective view of the pocket in the seat back, as viewed from rearside of seat back.

In this particular embodiment, a pocket structure is generally designated by (10), which is applied to a seat back (SB) of an automotive seat as shown in FIG. 4. According thereto, a back board (12) is attached to the back side of seat back (SB) and, to that back board (12), a base board (14) is mounted, of which the lower half area is shown to be covered with a pocket board member (16).

Centrally of the back board (12), a through hole area (12a) is formed, which is provided with a peripheral stepped flange portion (12a') and a lower stepped flange portion (12a''), such that the latter (12a'') is recessed more inwardly of the back board (12) than the former (12a'), as shown. In the first flange portion (12a'), a plurality of holes (12b) are formed, whereas in the lower flange portion (12a''), a plurality of holes (12b') are formed, with the arrangement that those holes (12b)(12b') are disposed in correspondence with the respective securing projections (14a) formed at the back side of base board (14). As seen from FIGS. 1 and 2, the base board (14) is so formed that its upper half area is of a plane shape flush with the surface of back board (12) while its lower half area is recessed from that upper half area in a direction inwardly of the back board (12) to rest upon the lower stepped flange portion (12a") thereof.

Thus, the base board (14) is securely attached within the through opened area (12a) of back board, simply by inserting the base board projections (14a) through the respective holes (12b)(12b') of peripheral stepped flange (12a') and then fitting push nuts (18) to the ends of projections (14), respectively. As best perceivable from FIG. 2, the lower half area of base board (14) is situated by the lower stepped flange (12a") at a level recessed inwardly of the back board (12) further from the plane level of the upper half area of same base board (14), whereupon it is seen that, as will be described later, in conjunction with the pocket board member (16), a spacing (14b) for accommodating articles is defined within such lower half area of base board (14).

While the foregoing attachment of the base board (14) to the back board (16) makes far easier the steps of assemblage involved, if desired, the projections similar to those (14a) may be formed at the peripheral stepped flange (12a') and the holes similar to those (12b)(12b') be formed at the base board (14), and the push nuts (18) may be replaced by E-rings or other split rings.

Designations (12c)(12c'), respectively, denote securing holes for the pocket board (16) and the ones for side cover members (16c), both of which holes are formed at the lower part of the peripheral stepped flange (12a), for the purposes to be set forth later.

The back board (12), base board (14) and pocket board (16) are preferably made of a plastics material and covered with a proper covering member. If required a proper foam padding of urethane foam material may be laminated between those boards and covering member to form a cushiony upholding.

The pocket board (16) is formed generally in a plane shape, having a size sufficient to cover the aforementioned lower half area of base board (14). The lower end of the pocket board (14) is provided with two leaf spring members (20) each having a generally U-shaped configuration. (In the drawings, one leaf spring member (20) is shown at one side of pocket board lower end, as in FIG. 1, but it should be noted that another leaf spring member (20) is fixed at another opposite side of pocket board lower end, although not shown. The reason therefor is just for simplicity in description.) Referring now to FIG. 2, it is observed that, at the lower end of pocket board (16), one of vertical sections of leaf spring member (20) is fixed to the rear wall of pocket board (16) by means of two revets (22), while on the other hand, another of them is fixed by means of bolts (24a) and nuts (24b) via the respective holes (12c') at the peripheral stepped flange (12a') to the back board (12), and further that a covering member (16a) is affixed over a core member (16b) to form the pocket board (16), such as to even cover that revetted connection part (at 22) of leaf spring member (20).

With such structure, the pocket board member (16) and recessed lower half area of base board (14) cooperate to defined the spacing (14b) in which a desired article may be accommodated, and the pocket board member (16) is urged by the leaf spring (20) into a position closing such spacing (14b), as shown, but, drawing the pocket board member (16) away from the base board (14) against the force of spring (20) provides an entry opening for access to the spacing (14b). Otherwise stated, the pocket board member (16) is rotatable forwardly and backwardly about the point at (20) for opening and closing thereof, so that an article may be entered into or take out from the spacing (14b).

Figure 1:
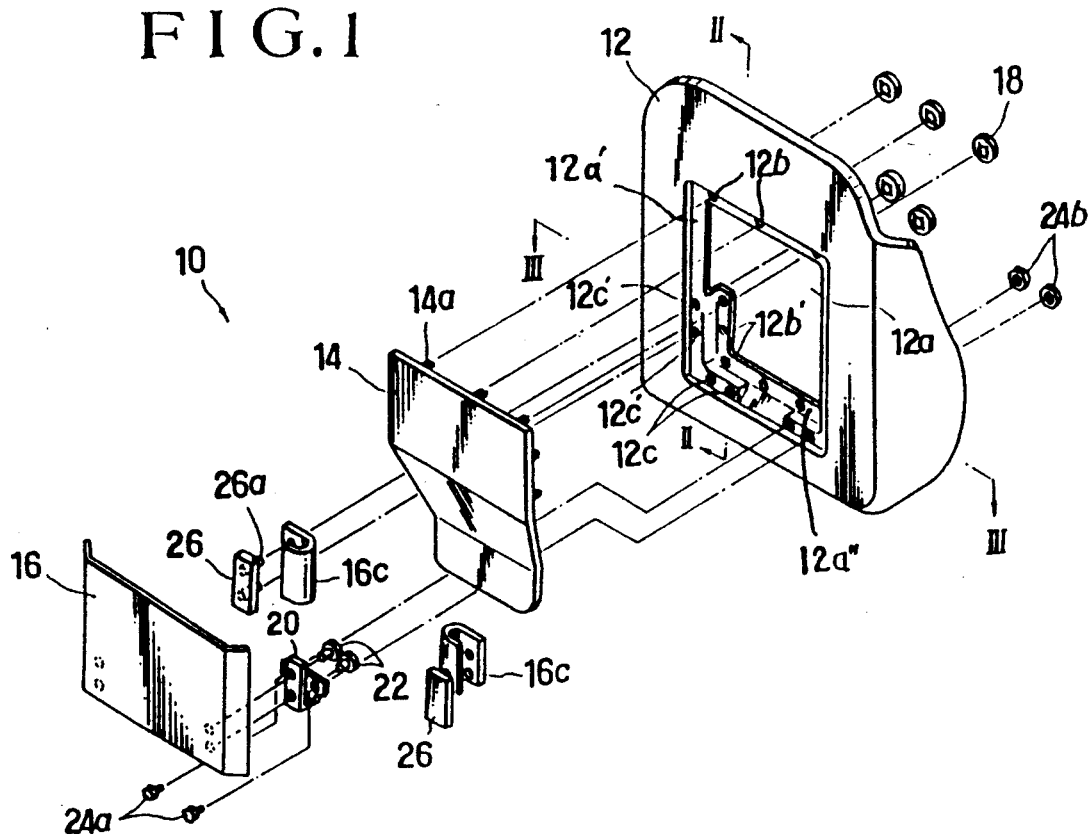
FIG. 1 is an exploded, perspective view of a first embodiment of pocket structure in seat back in accordance with the present invention.
Figure 2:
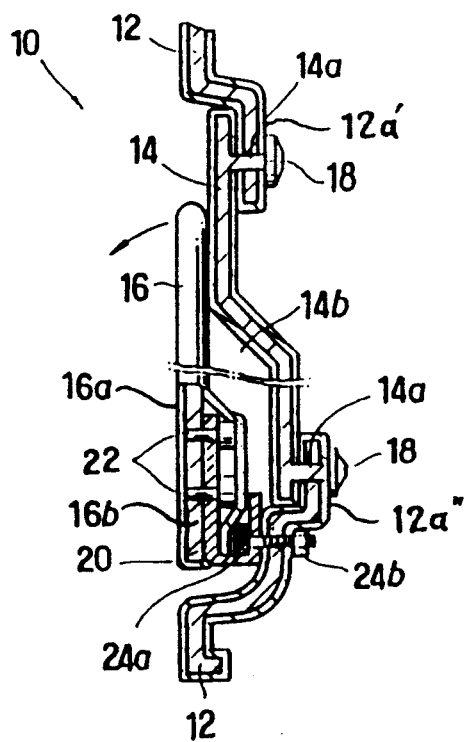
FIG. 2 is a sectional view taken along the line II—II in the FIG. 1.
Figure 3:
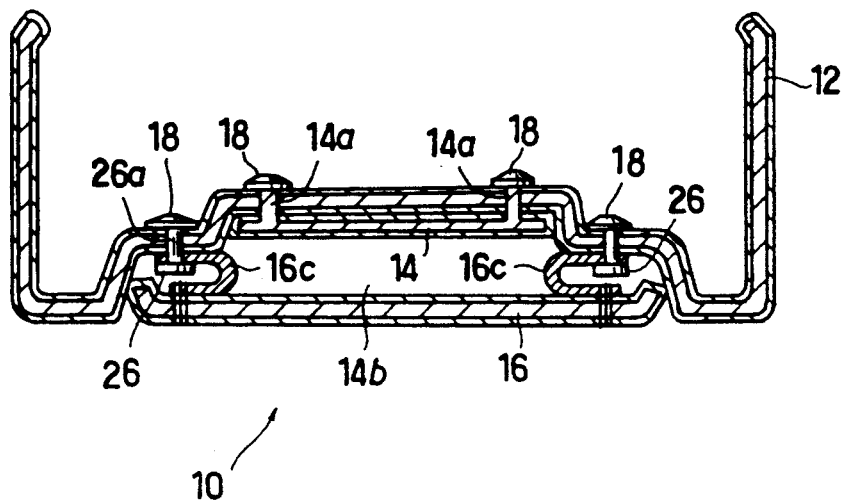
FIG. 3 is a sectional view taken along the line III-—III in the FIG. 1.

As can be seen from FIGS. 1 and 3, between the thus-formed pocket board member (15) and base board (14), there are provided a pair of flexible or soft side cover members (16c) to cover the respective side spacings at both lateral ends of pocket board member (15) with respect to the base board (14). Each of the side cover members (16c) is at its one end sewn to the pocket board member (15) and at its another end fixed by a retainer (26) to the back board (16), in such a manner that the width of side cover member (16c) is so greater enough to permit the pocket board member (15) to be drawn a certain distance from the base board (14). Hence, preferably, the side cover member (15) is formed in a properly slacken or bellows fashion. The retainer (26) is formed from an elongated plate of a length substantially extending over the height of the side cover member, which is formed with two securing projections (26a). Thus, by inserting the securing projections (26a) of retainer (26) through the respective holes (12c') and fitting the push nuts (18) to the respective ends of securing projections (26a), each of the side cover members (16c) is positioned in place at a given point as shown.

From the above descriptions, it is appreciated that, with the pocket board member (16) being normally closed to the base board (14), the outer appearance of those board elements looks as if there was no pocket or as if they were formed as an unitary board, thus giving no objectionable impression to an user. This effect may be amplified by affixing a same covering member over both of base board (14) and pocket board member (16). The pocket board member (16) is substantially surrounded by the recessed lower portion of base board (14) and the two side cover members (16c), so that any small articles are prevented from being dropped out of the pocket (16). Further, the provision of spacing (14b) at the recessed lower half area of base board (14) eliminates such problem of the pocket (16) per se being expanded when articles are full therein, as found in the prior art. Thus, the outer appearance of the pocket is not impaired, even when articles are stored therein. Since the leaf spring member (20) serves as a pivot point about which the pocket board member (16) is rotated, the construction of the present pocket arrangement is simplified much more, and as such, in the assemblage, the pocket board member (16) can readily be mounted to the back board (12).

Figure 5:
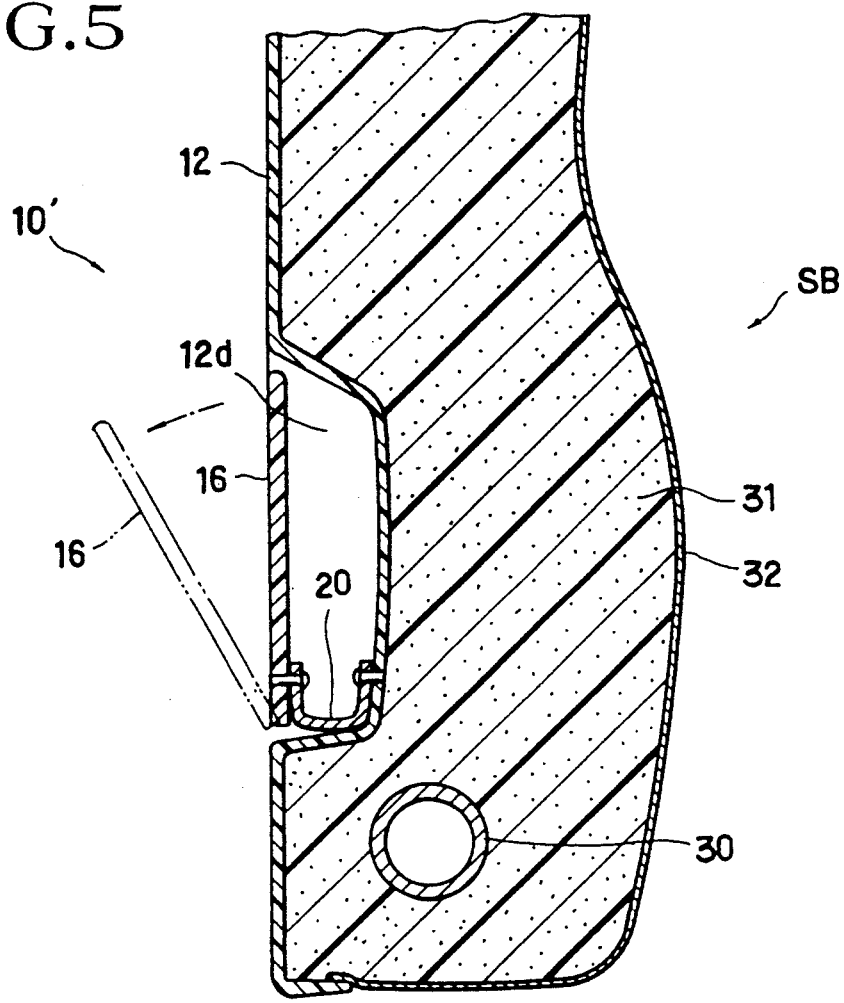
FIG. 5 is a sectional view of a second embodiment of pocket structure in the invention.
Figure 6:
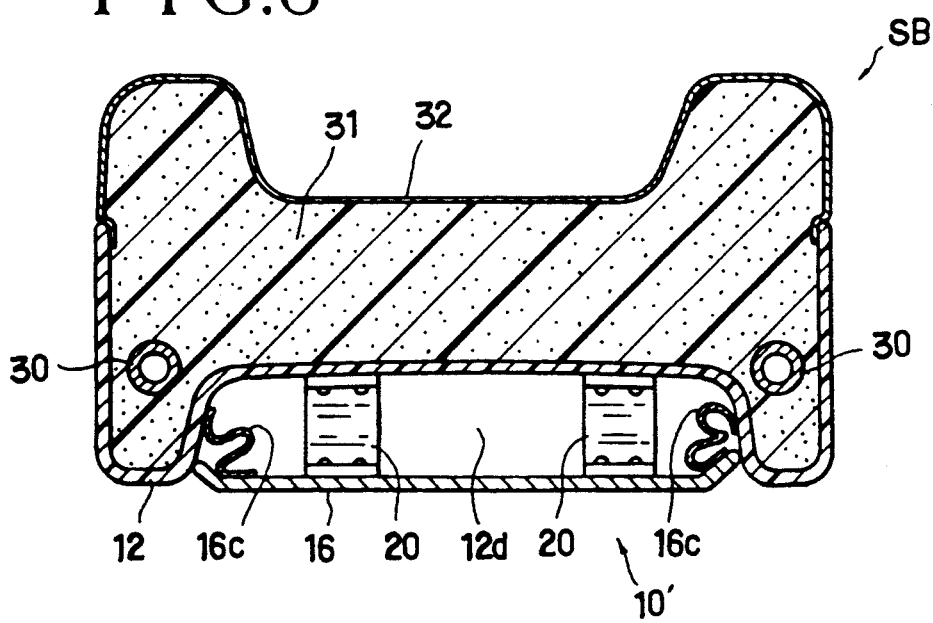
FIG. 6 is a cross-sectional view of the second embodiment as in FIG. 5.

FIGS. 5 and 6 show a second embodiment of the present invention. According to a pocket structure (10') in this embodiment, its principal point different from that (10) of the foregoing first embodiment is that no base board (14) is interposed between the pocket board member (16) and back board (11), and that a recessed area (14d) equivalent to the lower half area of base board (14) is directly formed in the back board (14). A pair of U-shaped leaf springs (20)(20) are provided between the lower end part of such recessed area (14d) and that of the pocket board member (16). The pocket board member (16) in this embodiment is formed in a size sufficient to cover the recessed area (14d). Designations (30)(31)(32) denote a seat back frame within the seat back (SB), a foam padding, and a covering member, respectively. The construction of the pocket structure is far more simplified than that of the first embodiment.

While having described the present invention thus far, it should be understood that the invention is not limited to the illustrated embodiments but any other replacements, modifications and additions may structurally be possible without departing from the spirit and scope of the appended claims.

What is claimed is:

1. A pocket structure in an automotive seat, comprising:
 a back board mounted on a back side of a seat back of said seat, said back board having a portion thereof recessed inwardly, said back board having a through opened area formed at a center part thereof, with said through opened area provided with a peripheral stepped flange along its peripheral edges and a lower stepped flange which is recessed more inwardly of said back board than said peripheral stepped flange, thereby defining a spacing inwardly of the back side of said seat back;
 a base board secured to said back board to cover said through opened area, said base board having a lower half area recessed inwardly of said back board;
 a pocket board member for covering said back board and defining a spacing in association with said back board and said base board to accommodate articles;
 a spring means provided between a lower end part of said back board and that of said pocket board member, said spring means biasing said pocket board member in a direction towards said back board.

2. The pocket structure as defined in claim 1, wherein said base board is firmly attached within said through opened area of said back board in such a manner that an upper half area of said base board is fixed to said peripheral stepped flange and said recessed lower half area of said base board is fixed to said lower stepped flange and wherein said pocket board member is fixed via said spring means to a lower part of said peripheral stepped flange of said back board.

3. The pocket structure as defined in claim 1, wherein said spring means comprises at least one leaf spring of a generally U-shaped configuration, having a pair of spaced-apart vertical sections, and wherein one of said two vertical sections of said leaf spring is fixed to said lower end part of said back board and another of said two leaf spring vertical sections is fixed to said lower end part of said pocket board member.

4. The pocket structure as defined in claim 1, wherein a pair of side cover members are each fixed to both lateral ends of said pocket board member, respectively, and wherein said pair of side cover members are further fixed to said back board, whereby lateral spacings at the respective said lateral ends of said pocket member is covered with said two side cover members with respect to said back board.

5. The pocket structure as defined in claim 1, wherein, said base board lower half area corresponds to said lower half area of said back board, thus defining therein said spacing for accommodating said article.

6. The pocket structure as defined in claim 5, wherein, said inwardly recessed portion of said back board is located at a lower half area thereof which defines said spacing.

7. A pocket structure in an automotive seat comprising;
 a back board mounted on a back side of a seat back of said seat, said back board including a through opened area formed at a center part thereof and a peripheral stepped flange provided along peripheral edges of said through opened area and a lower stepped flange which is recessed more inwardly of said backboard than said peripheral stepped flange,
 a base board secured to said back board and having a lower half area recessed inwardly of said back board, said lower half area corresponding to said lower half area of said back board and defining a spacing for accommodating an article,
 a pocket board member associated with said back board and covering said space to accommodate articles and,
 a spring means provided between a lower end part of said back board and a lower end part of said pocket board member, said spring means biasing said pocket board member in a direction toward said base board and allowing said pocket board member to be pivoted outwardly about said spring means to access said space.

8. The pocket structure as defined in claim 7, wherein said spring means comprises at least one leaf spring of a generally U-shaped configuration, having a pair of spaced-apart vertical sections, and wherein one of said two vertical sections of said leaf spring is fixed to said lower end part of said back board and another of said two leaf spring vertical sections is fixed to said lower end part of said pocket board.

9. The pocket structure as defined in claim 8, wherein, said base board is attached within said through opened area of said back board in such a manner that an upper half area of said base board is fixed to said peripheral stepped flange and said recessed lower half area of said base board is fixed to said lower stepped board, and wherein said pocket board member is fixed via said spring means to a lower part of said peripheral stepped flange of said back board.

10. The pocket structure as defined in claim 8, wherein, a pair of side cover members are secured to lateral ends of said pocket board member, with said pair of side cover members further being secured to said backboard, whereby lateral spacings at the respective said lateral ends of said pocket board member are covered with said two-side cover members with respect to said back board.

* * * * *